Patented June 27, 1939

2,163,983

UNITED STATES PATENT OFFICE 2,163,983

PROCESS OF REPRODUCING CELLS FOR OXIDE FILM ARRESTERS

Masahisa Ona, Ogikubo, Suginami-ku, Tokyo, Japan

No Drawing. Application August 4, 1937, Serial No. 157,453. In Japan November 15, 1935

1 Claim. (Cl. 175—30)

Nature and principal object of the invention

The present invention relates to a process of restoring special volt-ampere feature of cells, disordered by overcurrent passed beyond the standard voltage limit of oxide film arrester, by gradually heating the cell at the temperature of 110° to 150° centigrade and then gradually cooling them, and is characterized in that by the process of this invention, cells disordered by repeated electric discharge during their use may be simply and economically reproduced so that the reproduced cells are just as good as new ones.

Full explanation of the invention

When some conductive metallic oxide is overheated beyond some standard temperature, it is restored and changes its nature to a non-conductive body.

The utilization of the above mentioned nature is the fundamental principle governing an oxide film arrester. Peroxide of lead is a good example and oxides of tin and bismuth have nearly the same qualities.

Peroxide of lead ($PbO_2$) has the resistance of about 1 ohm per 1 cubic inch (or 2.54 ohms per 1 cubic centimetre). When it is heated to a temperature of 150° C., it is restored and becomes red lead ($Pb_3O_4$) and its relative resistance becomes 24 megohms.

When the temperature is made to go up as high as 250° C., it becomes litharge (PbO) and changes to a non-conductor of electricity. When peroxide of lead, usually in powder state, is introduced into two electric poles and a current passed through them, contact resistance between the poles and the powders of peroxide of lead takes place and partial overheating is caused and films of lead oxide are formed, which shut the electric passage.

In the usual oxide film arrester using peroxide of lead, two brass or iron plate poles are coated with shellac, paint, varnish or Japanese lacquer to form non-conducting film, and then porcelain container is tightly sealed on top and bottom and the inside is filled and packed with powder of peroxide of lead, thus to form cells of disk shape of 190 mm. in diametre and 16 mm. in thickness.

One cell thus formed, stands an electrical voltage of about 350 to 400 volts and many cells are used to suit the required voltage.

When cell is overloaded with sudden electric shock, innumerable small holes of about 0.005 cm. in diametre are produced on the film and insulating film is broken, allowing the quick passing of current and peroxide of lead is intensely heated, quickly reduced and becomes an insulating substance and thus shuts the passage of the current simultaneously with the electric discharge.

This sort of arrester, namely oxide film arrester, unlike aluminium arrester, does not use electrolytic solution and oil and therefore does not freeze, possesses simplicity of construction and many other special features, and therefore is widely used in electric lines, but when the electric discharge is repeated, the cell and the feature of volt and ampere undergoes gradual change and after a year or two, passage of overcurrent makes the cells unsuitable for use.

The process of this invention is to reproduce thus disordered cells by heating gradually at the temperatures of 110° C. to 150° C. and then by cooling gradually. The cells thus reproduced will have almost the same quality as new cells.

The actual process of this invention is generally to take disordered market-cells, place them in a vessel, gradually heat them for 20 or 30 minutes at or near the temperature of 110 C., taking care that the temperature does not go up above 150° C. But it may be necessary to heat them for several times according to the state of disorder. It has been discovered that the cells thus treated have been reproduced to possess almost the same quality as entirely new cells.

There are many ways to inspect the cells.

In the case of applying 350 volts of 50 cycle alternating current to market-cells, cells are considered to be in good condition, if the passing current is under 50 milli-amperes.

Cells may also be inspected by water drops or by using oxygen etc.

By using the process of this invention, about 380 cells out of 400 disordered cells (about 95%) have been perfectly reproduced and found in good conditions as in new cells.

Below I give the results of my investigations made between 1929 to 1935.

*Record of experiments, relating to process of reproducing cells for oxide film arrester*

| Disordered cells, voltage volt. | Disordered cells, current milli-ampere | Reproduced cells, current milli-ampere | Disordered cells, voltage volt. | Disordered cells, current milli-ampere | Reproduced cells, current milli-ampere | Disordered cells, voltage volt. | Disordered cells, current milli-ampere | Reproduced cells, current milli-ampere |
|---|---|---|---|---|---|---|---|---|
| 349 | 90 | 40 | 350 | 73 | 29 | 350 | 101 | 36 |
| 350 | 98 | 35 | 350 | 74 | 29 | 348 | 92 | 28 |
| 353 | 85 | 32 | 350 | 78 | 39 | 347 | 68 | 26 |
| 350 | 78 | 29 | 348 | 80 | 20 | 357 | 53 | 20 |
| 350 | 82 | 28 | 355 | 81 | 26 | 350 | 89 | 18 |
| 348 | 83 | 25 | 348 | 76 | 24 | 350 | 87 | 31 |
| 350 | 82 | 37 | 350 | 73 | 26 | 348 | 101 | 35 |
| 350 | 80 | 36 | 349 | 69 | 28 | 348 | 103 | 29 |
| 350 | 76 | 31 | 352 | 83 | 36 | 351 | 96 | 41 |
| 348 | 80 | 30 | 350 | 87 | 42 | 357 | 97 | 38 |
| 347 | 95 | 29 | 349 | 89 | 41 | 352 | 97 | 40 |

In reproducing the disordered cells, the proper temperature of heating will be about 110° C. to 135° C.

Care should be taken so that the temperature will not be under 110° C. or above 150° C.

Having thus particularly described and ascertained the nature of my said invention and in what manner the same is to be performed, I declare that what I claim is:

A method of recovering and reproducing disordered oxide film arresters through which repeated discharges have taken place, consisting in gradually heating the cells at a temperature between 110° C., and 150° C., for 20 to 30 minutes and then gradually cooling the cells, whereby they are recovered and resume their electric features and can perform their duties as in the case of new arresters.

MASAHISA ONA.